April 12, 1955
A. M. BLOOM
2,705,913
WIENER ROASTING MACHINE
Filed July 31, 1952
3 Sheets-Sheet 1
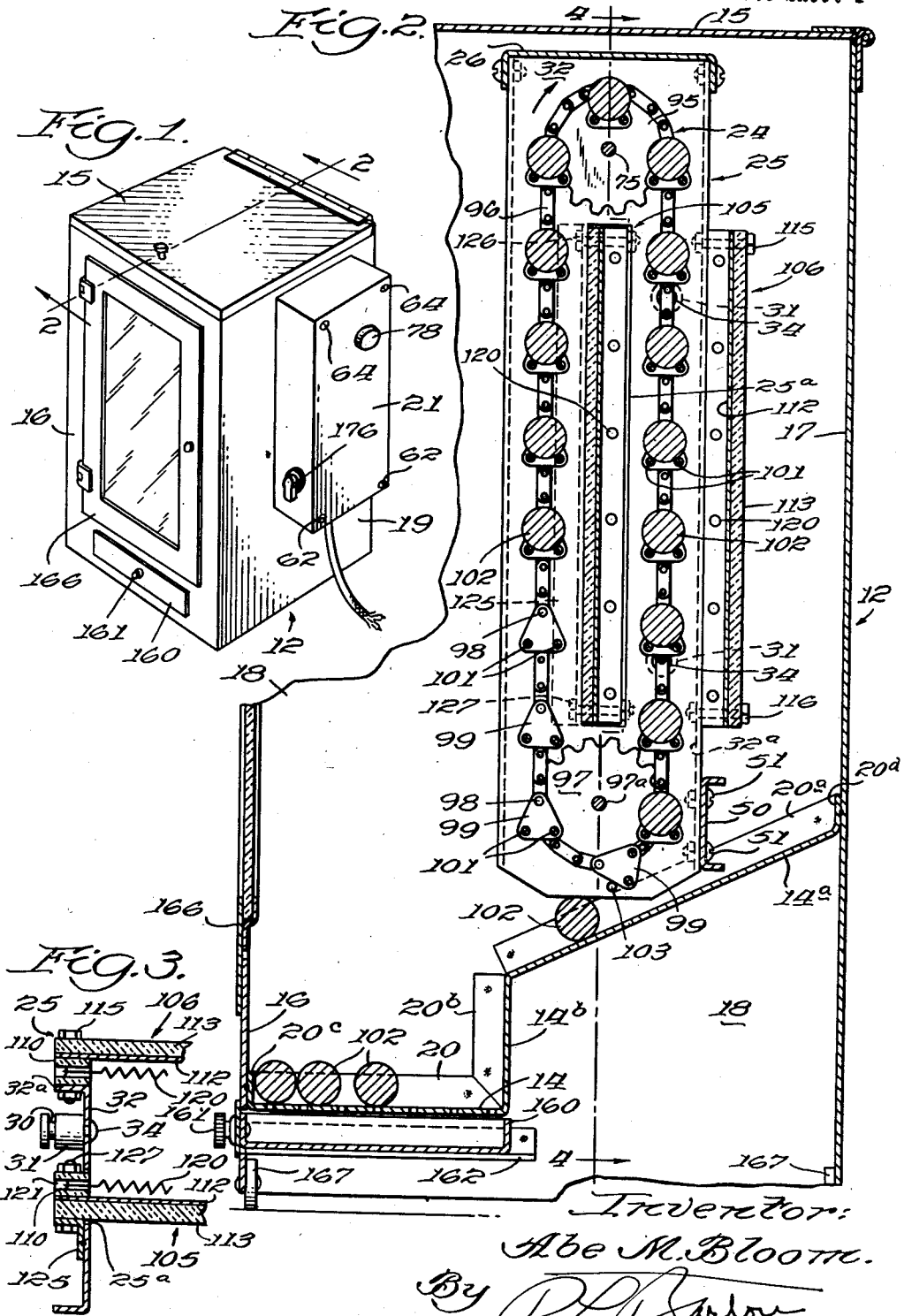
Inventor:
Abe M. Bloom
By R. L. Barlow
Atty.

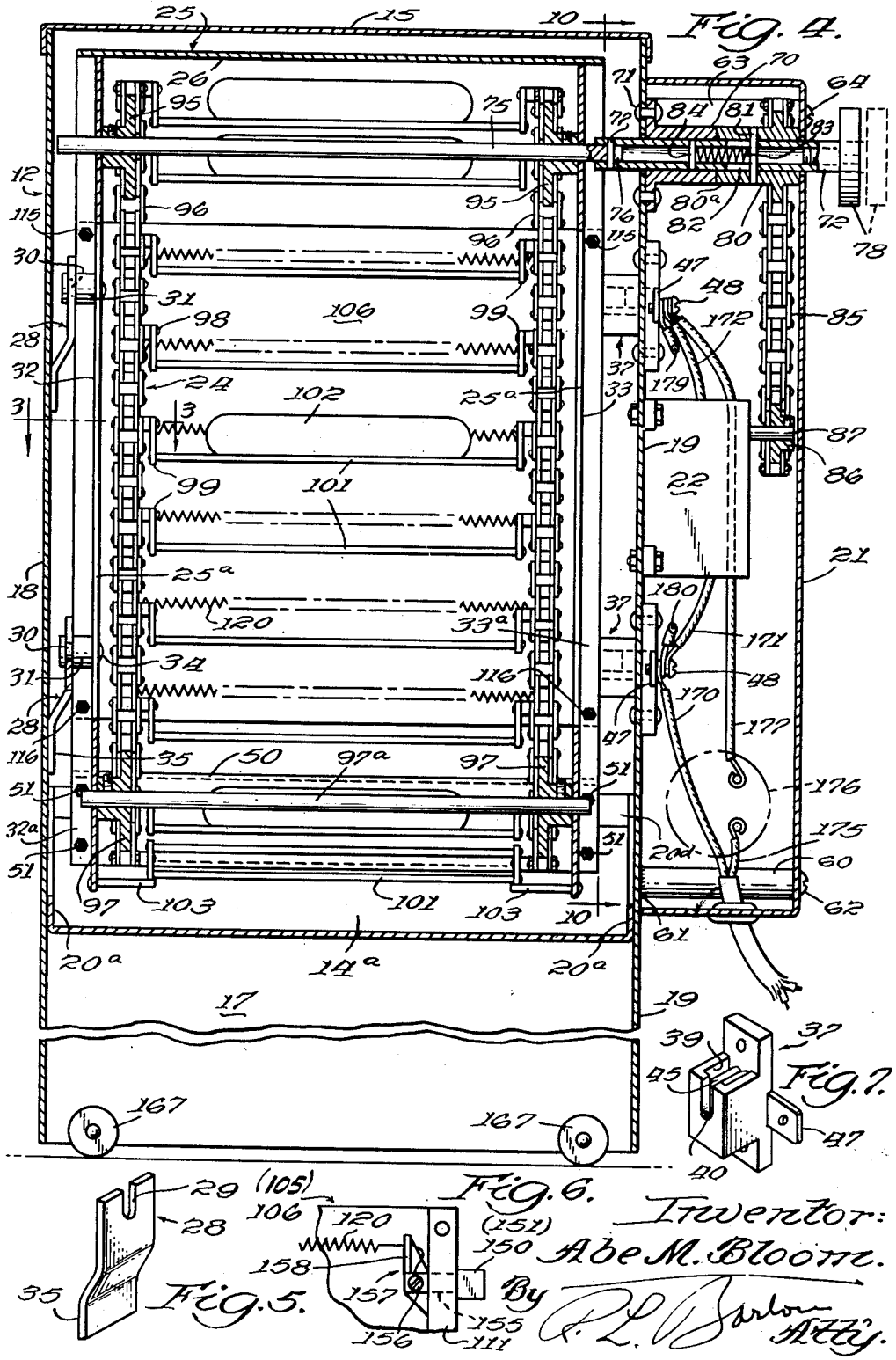

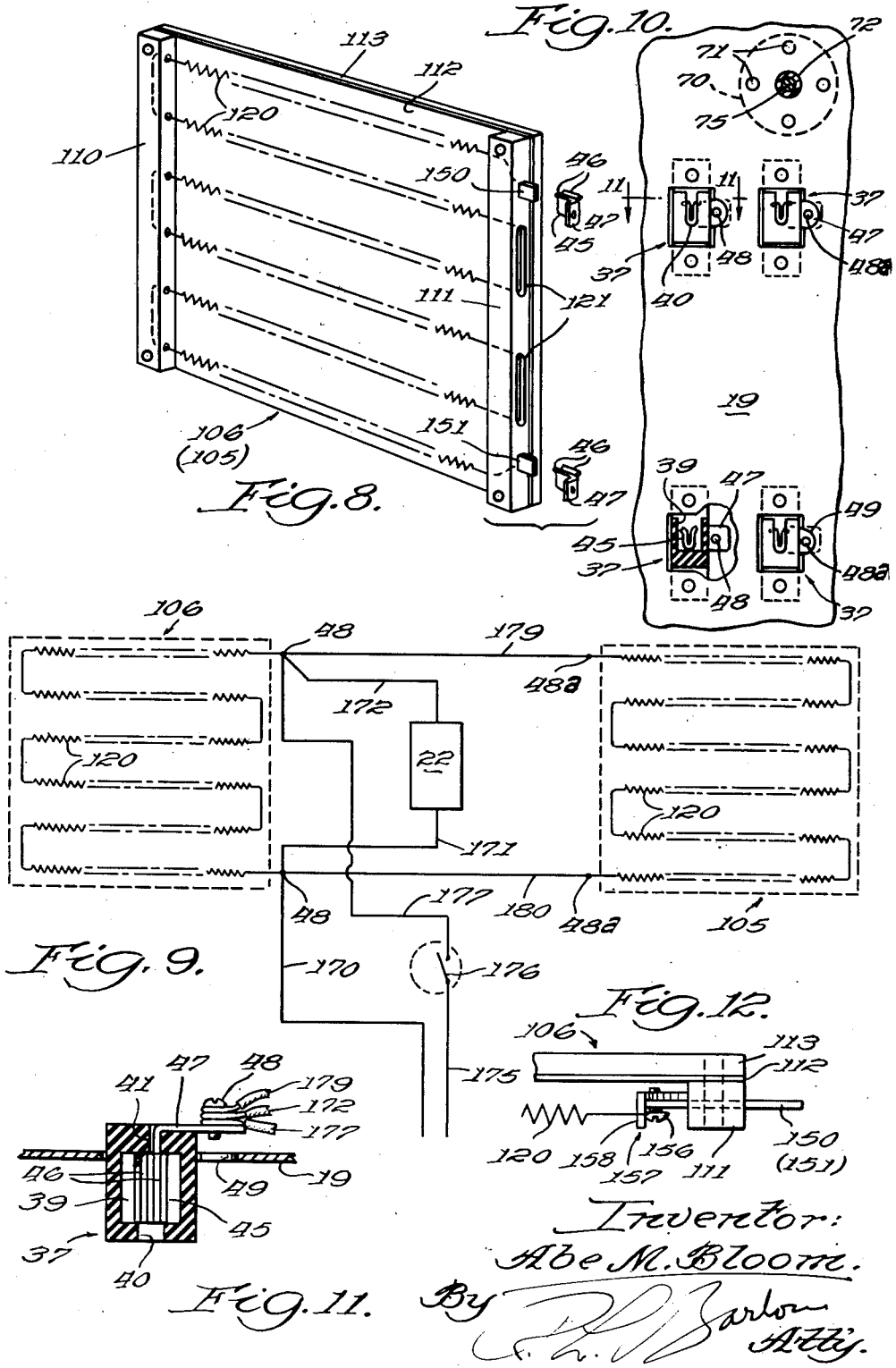

United States Patent Office 2,705,913
Patented Apr. 12, 1955

2,705,913

WIENER ROASTING MACHINE

Abe M. Bloom, Van Nuys, Calif.

Application July 31, 1952, Serial No. 301,824

2 Claims. (Cl. 99—427)

This invention relates to a machine which, although primarily intended for roasting wieners, may be advantageously used to cook or toast various other food products.

One object of the invention is to provide a machine usable to roast, more rapidly and more uniformly, a considerable number of wieners at a time, by means of an endless conveyor which is mechanically driven in a timed manner, and whereby the wieners are progressively conveyed through a zone of heated air within the casing of the machine.

Another object of this invention is to provide, in that type of wiener roaster wherein wieners are progressively, mechanically conveyed through a zone of heated air by an endless, wiener advancing conveyor, a simplified means for removably supporting said conveyor within said casing, so that it can be conveniently removed for cleansing and as readily, after being cleansed, be replaced in its operative position.

Yet another object is to provide, for an endless conveyor for wieners while being roasted, an improved combination of swingably mounted individual wiener carriers and dumping means for said carriers whereby they are successively automatically swung to a wiener dumping position by the time the wieners which they carry have been properly roasted.

Yet still another object is to provide, in a machine having the aforesaid removable and replaceable wiener conveyor, an improved combination of means for removably supporting said conveyor within the casing of the machine, and to co-operate with that means a motor shaft drive arrangement wherein a sectional, motor driven shaft the sections of which may be disconnected preparatory to the removal for cleansing and subsequent replacement of the wiener conveyor.

Other objects, advantages and features of invention will hereinafter appear.

Referring to the accompanying drawings, wherein is disclosed an illustrative embodiment of the invention, Fig. 1 is a perspective view, on a smaller scale than the remaining views, of the complete device.

Fig. 2 is an enlarged, fragmentary vertical section on line 2—2 of Fig. 1, wieners being shown on most of the wiener carriers.

Fig. 3 is a transverse sectional detail on line 3—3 of Fig. 4, showing only removable parts.

Fig. 4 is a vertical section on angular line 4—4 of Fig. 2, only four of the wiener carriers being shown loaded with wieners.

Fig. 5 is a perspective view of one of the supports for the cage upon which the endless conveyor is mounted.

Fig. 6 is a fragmentary vertical elevation of one of the electrical connections with which the heating elements are provided.

Fig. 7 is a perspective view of one of the combined electrical switch elements and cage supports, located at the opposite side from that occupied by the cage support shown in Fig. 5.

Fig. 8 is a perspective view of one of the paired heating panels, the two contact supporting elements being shown, per se, adjacent to their assembled positions.

Fig. 9 is a wiring diagram.

Fig. 10 is a fragmentary section on line 10—10 of Fig. 4.

Fig. 11 is a fragmentary transverse section on line 11—11 of Fig. 10, the scale being enlarged.

Fig. 12 is a top plan view of the structure shown in Fig. 6.

Referring in detail to the drawings, the machine shown in them comprises a casing 12 having a horizontal floor portion 14, inclined floor portion 14a, a vertical wall portion 14b connecting said floor portions 14 and 14a, a swingable top cover 15, front wall 16, back wall 17 and side walls 18 and 19. Said floor portions 14 and 14a and intervening wall portion 14b are, respectively, provided with attaching flanges 20, 20a and 20b, spot welded or otherwise secured to the casing walls 18 and 19. Said floor portions 14 and 14a are also provided with upstanding flanges 20c and 20d welded or otherwise secured to the front and rear casing walls 16 and 17.

Overlying a portion of the casing side wall 19 is a vertically elongated sheet metal housing 21, which contains a motor 22 (see Fig. 4), along with other structures presently to be described.

The endless conveyor 24, which conveys the wieners during the roasting period, is mounted within a vertically elongated cage 25, rectangular as viewed in plan, said cage being mounted within the aforesaid casing 12 and extending nearly from side to side thereof, but having a front to rear dimension much less than said casing. This cage comprises an intact sheet metal top wall 26, below which it is of a skeletal character. The means for supporting said cage detachably for upward removal comprises, as shown in Fig. 5 and in the left hand portion of Fig. 4, a pair of vertically spaced apart brackets 28 each of which has a deep, upwardly opening slot 29 in its upper edge. Within said slots seat the neck portions 30 of studs 31 which are carried by and project outwardly from a vertical wall portion 32 with which the aforesaid cage 25 is provided, said cage having also a corresponding opposite wall 33. Each said stud is shown attached to said wall portion by means of a peened over central boss 34 which projects through a small hole in the wall. Said brackets 28 are shown as small, rectangular metal plates having outwardly offset lower end portions 35 spot welded or otherwise secured to the inner side of the casing wall 18.

At its opposite side said cage 25 is shown removably supported by four switch carrying members 37, the relative positions of which are best shown in Fig. 10. Each of these members comprises an insulating block having flanged upper and lower end portions riveted externally to the casing wall 19, said wall being rectangularly apertured to receive the body portion of each block 37, as shown in Figs. 4, 10 and 11. In front of its said flange portions each said member 37 has in it a deep, rectangular recess 39 horizontally bounded by wall portions of the block, and an open-topped, vertical slot 40 leads from said recess through the front wall portion of the member or block 37. Also a slot 41 (see Fig. 11) leads through said block from the back side of said recess 39. In each of the four supporting structures shown in Fig. 10 a terminal clip 45 (subsequently bent into an L shape) is inserted from the front through said slot and projected through the insulating block, said terminal clip having resilient contact flanges 46 which are pressed together so as to render insertion possible. After insertion said terminal clip has its rearwardly projecting arm 47 bent right angularly and countersunk into the back side of the block, said arm having an apertured, projecting end portion into which is screwed a screw 48 whereby are attached conductors hereinafter described. Opposite to the inner end of each screw 48 a hole 49 is desirably provided in the wall 19 to safeguard against short circuiting. Said slot 40 provides clearance for insertion of the contact making elements.

The lower portion of the cage 25 is stabilized by a horizontal channel shaped tie bar 50 which extends across the back side thereof and is attached by bolts 51 secured to the flanges 32a and 33a of the cage members 32 and 33 as shown in Fig. 4.

Describing next the structures contained within the aforesaid housing 21, said housing is shown supported at its lower corners upon the casing side wall 19 by mounting means comprising a pair of lower spacer pins 60, welded at 61 to the casing wall 19 (one of said pins being shown in the lower right hand portion of Fig. 4), having each a supporting screw 62 screwed axially into it through a hole in the casing; and likewise supported in its upper corner portions by spacer pins 63 (welded on like the pin 60), and having similar supporting screws 64 screwed axially into them.

It will be seen from Fig. 2 that the aforesaid cage 25 is mounted much nearer to the back wall 17 of the casing than to its front wall 16, and likewise the housing 21 is mounted rearwardly of the midwidth of said casing. Said housing and cage are thus properly positioned for connecting with the conveyor 24 the driving means, which will now be described.

Subjacent to its upper end said housing 21 carries horizontal, tubular bearing member 70 having a radially flanged end portion which abuts the casing wall 19 and is secured thereto by rivets 71. Turnably and slidably fitted within said bearing member 70 is a tubular shaft 72 an end portion of which at all times projects into the casing 12.

The endless conveyor 24 comprises a horizontal driving shaft 75 the end portions of which have for their bearings circularly apertured portions of the side walls of the cage. Across one end of this shaft extends a diametrical slot 76, and said projecting portion of said tubular shaft 72 carries near its end a diametrical pin 77 which normally occupies said slot so as to produce a rotational operative connection between said shafts 72 and 75 when the end portion of the former shaft is telescoped over the slotted end of the latter shaft, as shown in Fig. 4. The opposite end portion of said shaft 72 projects through an aperture provided for it in the housing 21 and outside of said housing has secured to it a hand wheel 78 whereby it may be turned and also moved longitudinally from the full line to the dotted line position of Fig. 4, and vice versa. The elongated hub portion 80a of a sprocket wheel 80 is fitted around said shaft 72 and is prevented from rotation in relation to said shaft by a pin 81 which passes diametrically through said hub portion and slidably through a short diametrical slot 82 through said shaft 72. Said shaft 72 is normally positioned, as shown in full lines in Fig. 4, operatively connected with the conveyor shaft 75, being yieldingly held in this position by a coiled compression spring 83 one end of which abuts the aforesaid pin 81 and the opposite end of which abuts a third diametrical pin 84 carried by said shaft 72. The aforesaid sprocket wheel 80 is driven by a chain 85 which extends downwardly therefrom to a driving sprocket wheel 86, fixed to the shaft 87 of the electric motor 22.

Returning to the endless conveyor 24, to each end portion of its upper shaft 75 is secured a sprocket wheel 95, these sprocket wheels having outwardly directed hubs which abut the side walls of the cage 25. Over each of these wheels passes a chain 96, these two chains extending downwardly to and around a lower pair of sprocket wheels 97, mounted upon a shaft 97a. Alternate pivot pins 98 of each of these chains have inwardly projecting end portions, well shown in Fig. 4, and on each of these projecting pin portions swingably hangs by one of its corner portions, a triangular plate 99, a spacer sleeve surrounding said projecting pin portion to keep the swingably supported plate clear of the adjacent chain. The lower corner portions of the plates 99 at opposite sides of the conveyor 24 are connected by rods 101, said rods forming the bottoms of cradles, each cradle serving to support a wiener 102 during its passage through a zone of air heated to a roasting temperature by heating means presently to be described.

At each end of the lower part of the cage 25 extends inwardly therefrom a horizontal tripping pin 103 (see Figs. 2 and 4). The inner end portions of said pins are in the path of the descending, pendantly carried plates 99 and successively swing the cradles of which said plates form a part to wiener dumping positions and said plates glide over said pins.

As best shown in Fig. 2, in relation to the conveyor supporting cage 25 there is provided an internal or front electric heating member 105 and a rear electric heating member 106, these being elongated panels which extend vertically and are horizontally spaced apart so as to produce between their inner faces a zone of air heated to a wiener roasting temperature, the downwardly traveling run 24 of the conveyor being mostly in said zone.

The heating member 106 carries at one end a vertical post 110 and at its opposite end a like vertical post 111, these posts both being located in an overlying relation to the same face of the panel 106 and both abutting a layer of heat reflecting foil 112 desirably made of aluminum or of tin, said foil being backed by a substantial layer 113 of insulation, preferably "trinite," deemed to be a better heat insulator than asbestos.

Along the post 110 of the panel 106 the cage wall 32 has an outwardly directed flange 32a to the upper and lower end portion of which said post and parts 112 and 113 are secured by upper bolts 115 and lower bolts 116, the latter bolts being shown in Fig. 2. As to the post 111 (see Fig. 8), this post and the parts adjacent to it are bolted together and to a cage flange 33a shown in Fig. 4 in the same way as illustrated in the upper left hand portion of Fig. 3, and are supplied with the same reference numbers.

Said electric heating members each include a heat generating wire 120 with parallel runs, this wire being led back and forth through grooved portions 121 provided in the posts 110 and 111, it being understood that both of said posts are likewise externally grooved.

The other heating member 105 of the co-operating pair is constructed in the same manner as the already described panel 106, but at opposite sides of the cage is fitted into vertical slots 25a, one of said slots being in the cage wall 32, as shown in Figs. 2 and 4, and the other slot being in the cage wall 33, as shown in Fig. 4. A pair of vertical angle irons 125, one of which is shown in Fig. 3, are spot welded to the outer faces of the cage walls 32 and 33 and to each of these angle irons is secured by bolts 126 and 127, Fig. 2, the adjacent side portion of the heating panel 105, a heat generating wire like wire 120 being likewise arranged upon the panel 105.

The inner face of the right hand wall of the casing 12, as viewed in Fig. 4, and as seen in elevation in Fig. 10, carries the four already mentioned stationary supports for the adjacent side of the cage 25. This supporting means is in electrical connection with the heating elements or panels 105 and 106, through the two upper contact carrying supports 150 and the two lower contact carrying supports 151, which four supports are duplicates of each other, one being typically shown in Fig. 6.

Said supports 150 and 151 seat between the aforesaid paired contact flanges 46 to complete the electric circuit through the heating elements 105 and 106; and in order to permit said supports to occupy their seated positions, the aforesaid slots 40 are provided to afford clearance for their insertion between the contacts 46.

Said supports 150 and 151 are strap metal pieces having narrowed portions 155 which pass through the slots provided for them in the aforementioned side posts of the heating elements. These narrowed portions project inwardly from said posts and are secured by binding screws 156 to angular clips 157, preferably shaped as shown in Figs. 6 and 12, these clips abutting the inner sides of the posts and having upwardly directed flange portions 158 through apertures in which pass end portions of the wires 120.

The bottom wall section 14 of the casing is perforated to allow grease to pass therethrough and a drip pan 160, provided with a pull-out knob 161, is supported under said floor section upon and between angular guides 162.

The front wall of the casing 12 is provided with a door opening for a horizontally swingable door 166 which, when opened, affords access to the ascending run of the conveyor to load it with unroasted wieners, and to the roasted wieners which have been deposited upon the perforated floor section 14 after having been delivered from the endless conveyor.

In order to support the machine in a stable manner the front, rear and side walls of the casing 12 are shown extended downwardly for a considerable distance below the conveyor 24 and near their lower ends carry non-rotatable fiber disks 167.

Describing the electrical conductors and their connections more in detail, in Fig. 4 and Fig. 9 the current supply wire 170 is shown leading to the lower binding post 48 and from that point a wire 171 leads to the motor 22, from which leads a wire 172 to the upper binding post 48. The other line wire 175 leads to switch 176, from which the current passes through wire 177 to said upper binding post 48, the heat generating wire 120 of the heating member 106 being in circuit with said binding posts. The other heating member 105 is in a circuit having binding posts 48a which correspond to the aforesaid binding posts 48 and are connected to them by an upper wire 179 and lower wire 180, thus completing a circuit through said heating member 105.

In assembling the machine, after the two supporting brackets 28 have been attached interiorly (see Fig. 4), to the casing wall 18 and the four combined support and contact carrying members (see Fig. 7, also), have been attached interiorly to the opposite casing wall 19, the cover 15 will be swung to open position and the cage 25 together with the heating members 105 and 106 and endless conveyor 24 carried thereby, will be introduced through the open top of the casing 12 and lowered to a position wherein the cage carried studs 31 engage the seats 29 in the casing carried brackets 28 and at the same time the supports 150, 151 are wedged in between the contact flanges 46 of the four casing carried combined contacts and supports 37 (see also Fig. 10). This assembly operation will be performed with one hand of the operator while with his other hand he maintains the shaft 72 and knob 78 in the pulled out position indicated by dotted lines in Fig. 2, until the shaft 75 of the inserted cage alines axially with said shaft 72; whereupon, after turning said shaft 72 to a position wherein its pin 77 alines with the slot 76 in said shaft 75 the operator will allow the spring 83 to move said shaft 72 inwardly to the interlocked relation to shaft 75 shown in Fig. 4.

It will be seen that the mounted cage 25 is supported in a stable non-tiltable manner by combining, with the two vertically alined supporting brackets 28 on one side of the main casing the four quadrangularly arranged supporting members 37 at the opposite side of said casing.

From the foregoing description of the operation of putting into place within the casing the cage 25 and parts carried thereby it will be obvious how, after the switch 176 has been opened to stop the motor, the cage and cage carried assembly may be removed through the top of the casing for cleaning, and subsequently be reinstalled for more wiener roasting operations.

To put the machine into operation the switch 176 will be closed thus energizing the heat generating members 105 and 106 and at the same time starting the motor 22. Said motor will be timed slowly to advance the endless conveyor in the direction indicated by the arrow in the upper part of Fig. 2, thus causing the back run of said conveyor to descend at a sufficiently slow speed properly to roast the wieners as they pass downwardly through the zone of heated air between the heaters 105 and 106. Either before or after putting the conveyor and heaters into operation the operator will open the front door 166 and will load the unroasted wieners upon the pairs of rods 101 of the carriers which are pendantly attached to the conveyor chains 96 by the triangular plates 99, each of said plates having one of its corner portions pivoted to a chain link, said rods being secured to its other corner portions.

A considerable number of roasted wieners may be allowed to accumulate upon the floor section 14 before the operator opens the front door 166 and removes them.

I claim:

1. In a machine of the kind described, a casing, a cage mounted in said casing, said cage carrying parts which project horizontally out therefrom, electrically enegized heating means carried by said cage to create a zone of air therein heated to a roasting temperature, electrical conductors including certain of said parts to convey operating current to said heating means, an endless conveyor mounted upon said cage and positioned to conduct food product to be roasted through said heated zone, mechanical driving means for said conveyor comprising two disconnectible units one of which is carried by said cage and the other by said casing, thus rendering said cage removable from said casing, and supports carried by said casing upon which the aforesaid parts normally rest to support said cage and maintain said conveyor in its operative position, certain of said supports including upwardly directed sockets or seats which are electrically energized and said electrically energized sockets or seats normally supporting the aforesaid certain parts which constitute parts of electrical conductors.

2. In a machine of the kind described, a casing having upstanding side walls, a hinged cover for the otherwise open top of said casing, a cage mounted within said casing and insertable and removable through the top thereof, supports carried by the aforesaid walls of said casing to detachably support said cage within said casing, certain of said supports carrying electric circuit completing means, electrically energized roasting means carried by said cage in an electric circuit which includes said circuit completing means when said cage is resting upon the aforesaid supports therefor, said electrically energized means being secured to said cage the means for supporting said cage comprising electrically conducting parts of said roasting means which project outwardly from said cage and seat upon the aforesaid cage supports, an endless conveyor having a longitudinally extending series of food carriers pendently attached thereto, said conveyor transporting said carriers through a zone of air heated by said roasting means at a sufficiently slow speed to roast the contents of said carriers while passing through said zone, and means mounting said conveyor on said cage.

References Cited in the file of this patent

UNITED STATES PATENTS

| | | |
|---|---|---|
| 1,552,337 | Mottlau | Sept. 1, 1925 |
| 1,618,587 | Grady | Feb. 22, 1927 |
| 1,691,361 | Roberts | Nov. 13, 1928 |
| 1,696,613 | Shroyer | Dec. 25, 1928 |
| 1,753,601 | Eaton | Apr. 8, 1930 |
| 1,771,762 | Allwine | July 29, 1930 |
| 1,773,109 | McCaig et al. | Aug. 19, 1930 |
| 1,776,501 | Grady | Sept. 23, 1930 |
| 1,870,735 | Jones et al. | Aug. 9, 1932 |
| 1,993,607 | Kalgren | Mar. 5, 1935 |
| 2,046,471 | Lavenburg | July 7, 1936 |
| 2,182,229 | Hamel | Dec. 5, 1939 |
| 2,238,309 | Cramer | Apr. 15, 1941 |
| 2,450,563 | Rommel | Oct. 5, 1948 |